(12) United States Patent
Ha et al.

(10) Patent No.: US 8,542,197 B2
(45) Date of Patent: Sep. 24, 2013

(54) DISPLAY APPARATUS AND CONTROL METHOD OF THE SAME

(75) Inventors: Tae-hyeun Ha, Suwon-si (KR); Rustam Abdulaev, Suwon-si (KR); Jun-ho Sung, Seoul (KR); Hyung-rae Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 726 days.

(21) Appl. No.: 12/239,045

(22) Filed: Sep. 26, 2008

(65) Prior Publication Data

US 2009/0256812 A1    Oct. 15, 2009

(30) Foreign Application Priority Data

Apr. 15, 2008  (KR) .......................... 10-2008-0034869

(51) Int. Cl.
*G06F 3/041* (2006.01)

(52) U.S. Cl.
USPC .......................................................... 345/173

(58) Field of Classification Search
None
See application file for complete search history.

(56) References Cited

U.S. PATENT DOCUMENTS

| 5,610,629 | A | 3/1997 | Baur | |
|---|---|---|---|---|
| 7,133,032 | B2 | 11/2006 | Cok | |
| 2004/0207605 | A1* | 10/2004 | Mackey et al. | 345/173 |
| 2005/0219229 | A1* | 10/2005 | Yamaguchi | 345/173 |
| 2007/0152983 | A1* | 7/2007 | McKillop et al. | 345/173 |
| 2007/0157089 | A1* | 7/2007 | Van Os et al. | 715/702 |
| 2008/0158176 | A1* | 7/2008 | Land et al. | 345/173 |
| 2009/0189867 | A1* | 7/2009 | Krah et al. | 345/173 |

FOREIGN PATENT DOCUMENTS

DE    103 59 881 A1    7/2005

OTHER PUBLICATIONS

Communication, dated May 28, 2013, issued by the European Patent Office in counterpart European Patent Application No. 08171391.9.

* cited by examiner

*Primary Examiner* — Alexander S Beck
*Assistant Examiner* — Tony N Ngo
(74) *Attorney, Agent, or Firm* — Sughrue Mion, PLLC

(57) ABSTRACT

A display apparatus includes a display panel having a light emitting device, a sensor which senses an electric current flowing in the light emitting device, and a controller which determines that an external stimulus occurs to the display panel if a change of a sensed current exceeds a preset current change rate, and performs a predetermined operation on the basis of a determination result.

20 Claims, 12 Drawing Sheets

DISPLAY APPARATUS AND CONTROL METHOD OF THE SAME

CROSS-REFERENCE TO RELATED APPLICATION

This application claims priority from Korean Patent Application No. 10-2008-0034869, filed on Apr. 15, 2008 in the Korean Intellectual Property Office, the disclosure of which is incorporated herein by reference in its entirety.

BACKGROUND OF INVENTION

1. Field of Invention

Apparatuses and methods consistent with the present invention relate to a display apparatus and a control method of the same, and more particularly to a display apparatus having a light emitting device to display an image and a control method of the same.

2. Description of the Related Art

In general, a touch panel is provided in an outmost side of a display apparatus to be directly touched with a user's hand or an object, so that contents displayed on a screen of the display apparatus can be selected by the hand or the object. The display apparatus with the touch panel has been widely used since there is no need for an additional input unit such as a keyboard and a mouse, which operates while connecting with the display apparatus. In such a touch-type display apparatus, there has recently been developed a panel internally provided with a sensing electrode as an alternative to the touch panel provided on the surface of the display apparatus.

Further, there has recently been developed a method of sensing a stimulus through external light or a supersonic wave without an additional panel or film.

However, in the case of using the touch panel or sensing film, the brightness of an image decreases and a cost increases. Further, in the case of using the light or supersonic wave, a separate device is needed for sensing the stimulus and thus a production cost of the display apparatus increases.

SUMMARY OF THE INVENTION

The present invention provides a display apparatus having a simple configuration to sense an external stimulus, and a control method thereof.

The present invention also provides a display apparatus reduced in cost and capable of sensing an external stimulus, and a control method thereof.

According to an aspect of the present invention, there is provided a display apparatus including: a display panel which includes a light emitting device; a sensor which senses an electric current flowing in the light emitting device; and a controller which determines that an external stimulus occurs to the display panel if a change of a sensed current exceeds a preset current change rate, and performs a predetermined operation on the basis of a determination result.

The display panel may include a first electrode, a second electrode, and an organic light emitting material provided between the first electrode and the second electrode.

The sensor may include: a resistor which is connected between either of the first electrode or the second electrode and a ground; and an amplifier to which voltages applied to both ends of the resistor are input and which amplifies difference between the input voltages, and the controller determines that an external stimulus occurs to the display panel if an output signal from the amplifier is outside of a predetermined allowable range.

The controller may control the display panel to display user interface (UI) information to induce an external stimulus.

The controller may display a stimulus image, of which brightness exceeds reference brightness, on at least one region of the display panel to induce an external stimulus.

The controller may control the display panel to display a plurality of stimulus images on different regions, and determines which stimulus image receives an external stimulus.

The controller may display the plurality of stimulus images in sequence, and determines which stimulus image receives the external stimulus on the basis of a point of time when the external stimulus is given.

The sensor may be individually provided corresponding to the stimulus image.

The controller may determine amplitude of an external stimulus on the basis of a change rate of the sensed current, and displays different images depending on the amplitude of the external stimulus.

The controller may control the display panel to display a preset image if determining that an external stimulus occurs to the display panel.

The light emitting device may include a light emitting diode.

According to another aspect of the present invention, there is provided a display apparatus including: a display panel which includes an organic light emitting diode; and a controller which determines that an external stimulus occurs to the display panel if the display panel is changed in temperature.

According to another aspect of the present invention, there is provided a display apparatus including: a display panel which includes a light emitting device; a sensor which senses an electric current flowing in the light emitting device; and a controller which performs a predetermined operation if a change of a sensed current exceeds a preset current change rate.

According to another aspect of the present invention, there is provided a display apparatus including: a display panel which includes a light emitting device and a light emitting region divided into a plurality of regions; a plurality of sensors which sense an electric current flowing in each light emitting region; and a controller which determines that an external stimulus occurs to the light emitting region if a change of a sensed current is beyond a preset current change rate and performs a predetermined operation.

According to another aspect of the present invention, there is provided a method of controlling a display apparatus with a display panel including a light emitting device, the method including: sensing an electric current flowing in the light emitting device; determining that the display panel receives an external stimulus if a change of a sensed current exceeds a preset current change rate; and performing a predetermined operation on the basis of a determination result.

The display panel may include: a first electrode, a second electrode, an organic light emitting material provided between the first electrode and the second electrode, and a resistor connected between either of the first electrode or the second electrode and a ground, and the sensing of the electric current may include: sensing voltages applied to both ends of the resistor; determining a difference between the sensed voltages applied to both ends of the resistor; and converting the determined voltage difference into a digital signal.

The determination of the stimulus may include determining that the display panel receives an external stimulus if the digital signal is outside of a predetermined allowable range.

The method may further include displaying a stimulus image, of which brightness exceeds reference brightness, on at least one region of the display panel to induce an external stimulus.

The displaying of the stimulus image may include displaying a plurality of stimulus images on different regions of the display panel individually, repetitively and sequentially, and the determining of the stimulus may include determining which stimulus image receives an external stimulus on the basis of a point of time when the external stimulus is given.

The determining of the stimulus may include determining amplitude of an external stimulus on the basis of a change rate of the sensed current, and the performing of the operation may include displaying different images depending on the amplitude of the external stimulus.

The performing of the operation may include outputting the determination result.

The performing of the operation may include displaying a preset image on the display panel if determining that an external stimulus occurs to the display panel.

BRIEF DESCRIPTION OF THE DRAWINGS

The above and/or other aspects of the present invention will become apparent and more readily appreciated from the following description of exemplary embodiments, taken in conjunction with the accompanying drawings, in which.

DETAILED DESCRIPTION OF EXEMPLARY EMBODIMENTS OF THE INVENTION

Figure 1:
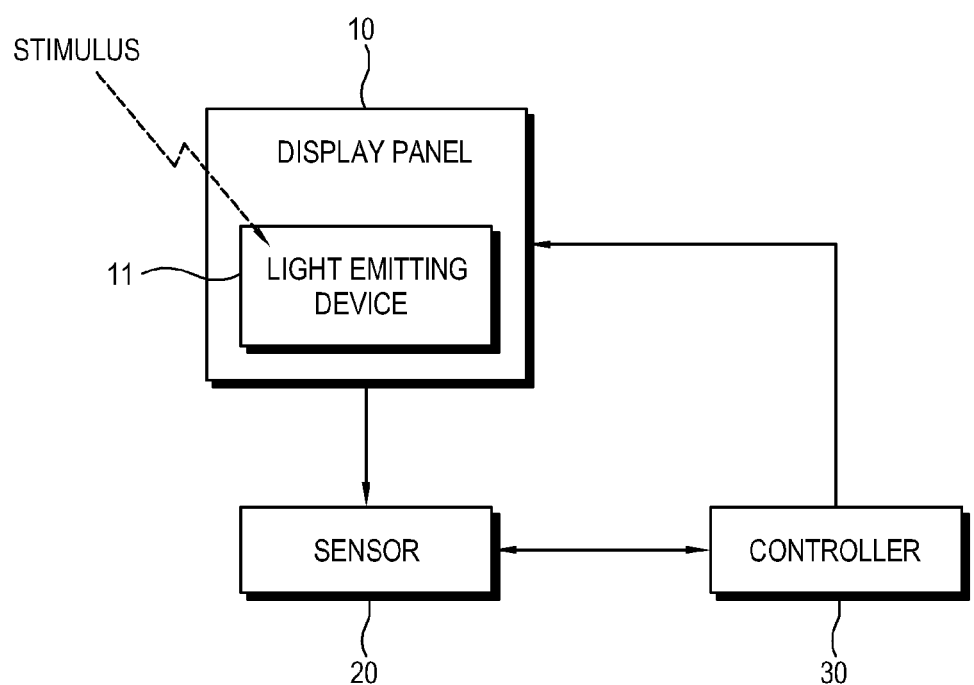
FIG. 1 is a control block diagram of a display apparatus according to a first exemplary embodiment of the present invention.

Exemplary embodiments of the present invention will be described in detail with reference to accompanying drawings so as to be easily realized by a person having ordinary knowledge in the art. The present invention may be embodied in various forms without being limited to the exemplary embodiments set forth herein. Detailed descriptions of well-known parts are omitted for clarity, and like reference numerals refer to like elements throughout.

FIG. 1 is a control block diagram of a display apparatus according to a first exemplary embodiment of the present invention. As shown in FIG. 1, the display apparatus includes a display panel 10 having a light emitting device 11, a sensor 20 for sensing a stimulus, and a controller 30 for controlling the display panel 10 and the sensor 20.

The light emitting device 11 emits light by itself to display an image. The light corresponds to the three primary colors, i.e., red, green and blue. The light emitting device 11 may include a light emitting diode (LED), an organic light emitting diode (OLED), or the like. Typically, the light emitting diode is placed behind a liquid crystal display (LCD) panel and used as a light source for illuminating the LCD panel. However, according to an exemplary embodiment of the present invention, the light emitting diode is used as an image display means that emits light by itself and displays an image. The light emitting device according to an exemplary embodiment of the present invention is changed in characteristics by an external stimulus. For example, the external stimulus may change the brightness of the light emitted from the light emitting device 11, a temperature of the light emitting device 11, or an electric current flowing in the light emitting device 11.

The sensor 20 senses the current flowing in the light emitting device 11 to sense the changed characteristics of the light emitting device 11.

The controller 30 determines that the external stimulus occurs to the display panel 10 when change of the sensed electric current exceeds a preset current change rate, and performs a predetermined operation on the basis of a determination result. As described above, the characteristics of the light emitting device 11 may be changed by the external stimulus. In an exemplary embodiment, the electric current flowing in the light emitting device 11 is changed. In other words, if the electric current is changed beyond a preset value, the controller 30 determines that the external stimulus occurs. The preset current change rate may be set on the basis of experiments, and indicates a critical current change rate where it is determined that the external stimulus occurs. If the display apparatus is a monitor connected to a computer, the controller 30 may provide the computer with the determination result that the external stimulus is given. If the display apparatus includes a control program such as a terminal or a television, the controller 30 may perform various operations corresponding to the external stimulus. Further, the controller 30 may output a control signal to power off, display a certain image, and control another external device.

According to another exemplary embodiment of the present invention, the sensor 30 may sense not the electric current flowing in the light emitting device 11 but a temperature change of the display panel 10 to sense the external stimulus. In other words, if the characteristics of the light emitting device that displays an image is changed by the external stimulus and the changed characteristic is sensed, such belongs within the scope of the present invention.

Figure 2:
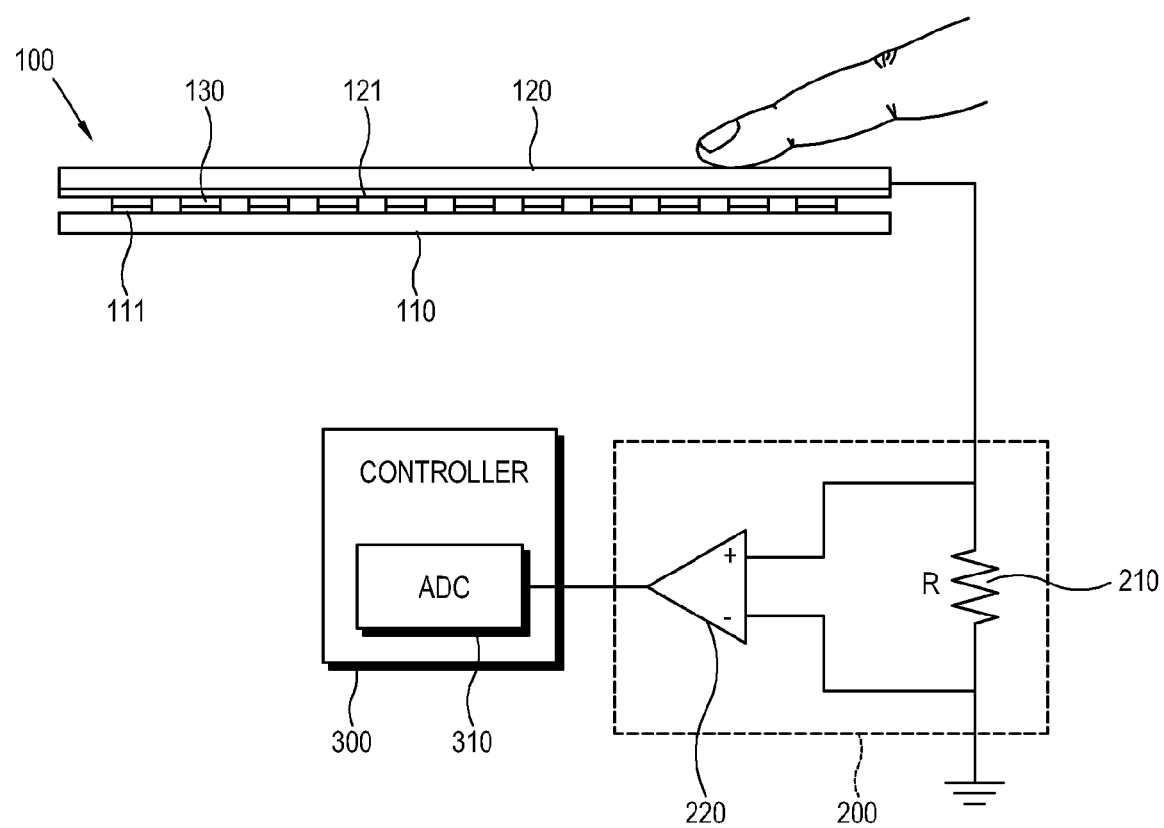
FIG. 2 is a schematic view of a display apparatus according to a second exemplary embodiment of the present invention.

FIG. 2 is a schematic view of a display apparatus according to a second exemplary embodiment of the present invention. The display apparatus includes a display panel 100, a sensor 200 and a controller 300.

The display panel 100 includes an organic light emitting display panel that uses an organic light emitting diode (OLED) to display an image. The organic light emitting display panel may include a passive matrix (PM) OLED or an active matrix (AM) OLED. The display panel 100 includes a first substrate 110 provided with a first electrode 111, an organic light emitting material 130 and a second electrode 121 covering the organic light emitting material 130, and a second substrate 120 placed in the outmost side. For convenience, the display panel 100 is schematically illustrated. Further, a wall (not shown) is formed between adjacent organic light emitting materials 130. The first electrode 111, the organic light emitting material 130 and the second electrode 121 constitute the OLED to emit light in response to an electric signal corresponding to a video signal. The light emitting diode is a light emitting device of which light emission is controlled by current control, and an electric current flowing in the light emitting diode is sensitive to a threshold voltage of the light emitting diode. Since the OLED also has the properties of the light emitting diode, the electric current flowing in the OLED decreases if the threshold voltage increases, but increases if the threshold voltage decreases. The organic light emitting material 130 may emit red, green and blue light, and may emit white light. If the organic light emitting material 130 emits white light, a color filter for representing colors is added to the first substrate 110. The electric signal corresponding to the video signal and a common voltage are applied to the first electrode 111 and the second electrode 121, respectively.

When the organic light emitting material 130 emits light, heat is generated along with the light, so that temperature of the display panel is typically higher than room temperature. Because the threshold voltage of the OLED is susceptible to the temperature, the threshold voltage of the OLED is also changed when the temperature of the display panel 100 is changed. If the temperature increases, the threshold voltage decreases in level. If the temperature decreases, the threshold voltage increases in level. Such a change of the threshold voltage causes the electric current to be changed. In an exemplary embodiment, the display apparatus induces the temperature change of the display panel 100, i.e. a stimulus of changing the threshold voltage of the OLED, thereby sensing the external stimulus without an additional panel. For example, temperature of a human body, a pointer or the like is generally lower than that of the display panel 100. The display panel 100 may have a temperature of about 40 to 60 degrees (Celsius) while displaying an image. If an object having a lower temperature than the display panel 100 contacts the display panel 100, the temperature of the display panel 100 decreases. The temperature decrease of the display panel 100 increases the threshold voltage of the OLED, thereby causing the electric current flowing in the OLED to decrease.

The sensor 200 includes a resistor 210 connected between the second electrode 121 and a ground, and an amplifier 220 to which voltages applied to both ends of the resistor 210 are input, and senses the electric current flowing in the OLED. By sensing voltage drop due to the resistor 210, the electric current flowing between the first electrode 111 and the second electrode 121 is sensed. The amplifier 220 is achieved by a differential amplifier 220 to amplify and output voltage difference between the both ends of the resistor 210.

The controller 300 includes an analog-digital converter (ADC) 310 to convert an output signal from the amplifier 220 into a digital signal, and determines that a stimulus occurs to the display panel 100 if the output signal is outside of a predetermined allowable range. Here, the allowable range is a value corresponding to the preset current change rate of the foregoing exemplary embodiment. For example, the current change rate may be set to about 2% to 10%, preferably 2% to 5% of the current of when the external stimulus does not occur. Further, such an allowable range may be set in consideration of the characteristics of the display panel 100, a noise component of the amplifier 220, etc. While an electric current of about 100 mA flows corresponding to an image displayed on the display panel 100, if more or less current flows as much as 5% of 100 mA, i.e., 5 mA for 1 to 2 seconds, the controller 300 determines that the external stimulus occurs. When it is determined that the external stimulus occurs, the controller 300 displays a preset image corresponding to the stimulus or performs another controlling operation.

Figure 3:
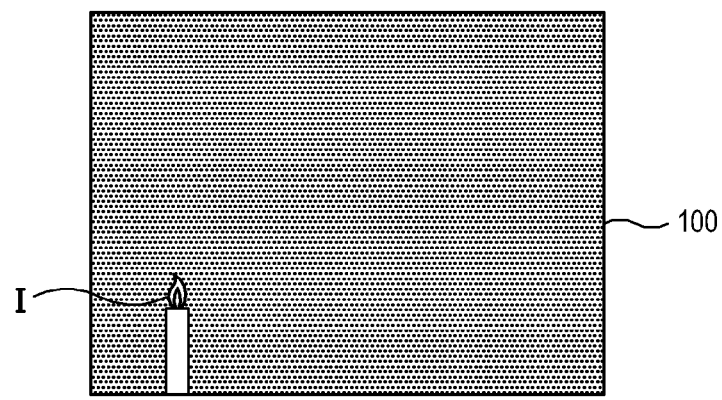
FIG. 3 shows an exemplary embodiment of a stimulus image in the display apparatus of FIG. 2.

FIG. 3 shows a stimulus image in the display apparatus of FIG. 2. As shown therein, the display panel 100 displays a stimulus image I for inducing the stimulus at a predetermined region thereof The stimulus image I has brightness higher than reference brightness. Here, the reference brightness is set to brightness where no electric current flows, i.e., set to "0." Because the external stimulus is determined on the basis of change in the electric current flowing in the OLED, the brightness of the stimulus image I exceeds "0," i.e., has all brightness except a black image. Further, other regions of the display panel 100 where the stimulus image I is not displayed have a brightness of "0." Even if a user gives a stimulus to another region where the stimulus image I is not displayed, the controller 300 does not perform any operation since it cannot determine the given stimulus. As shown in FIG. 3, the stimulus image I is a candle. If a user blows toward the candle, temperature changes and thus the controller 300 determines the stimulus of the temperature change and controls an image to be displayed as if the candle is extinguished. Such an image arouses interest of a user and can be utilized for marketing as features of the display apparatus. Like this, if a certain event is expected to follow a stimulus given to a certain image, the black image and the stimulus image I may be displayed.

According to an exemplary embodiment, the temperature change of the display panel 100 is directly related to the sense of the stimulus, so that infrared can be used to increase the temperature or wind can be used to decrease the temperature. Thus, the display apparatus may include at least one of a pointer, a cooling device and a heating device in order to change the temperature.

Figure 4:
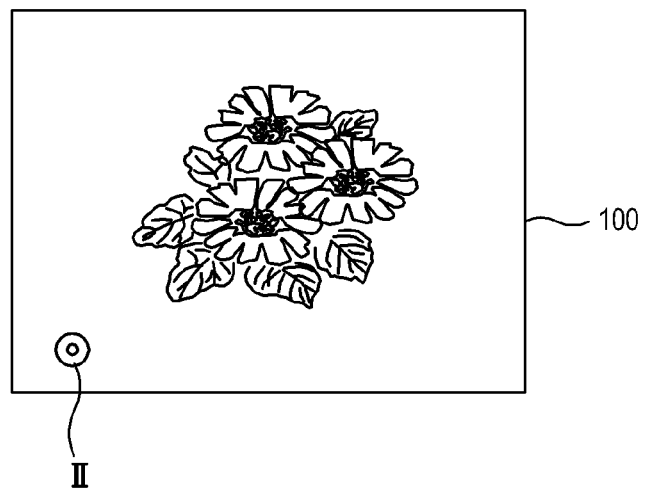
FIG. 4 shows an exemplary embodiment of a user interface (UI) information in the display apparatus of FIG. 2.

FIG. 4 shows a user interface (UI) information in the display apparatus of FIG. 2.

The UI information II is a button image displayed in a part of the display panel 100 that displays another image. The UI information II is provided for inducing a user to give a stimulus, and a user is informed that he/she can give the stimulus through the UI information II. When the UT information II is displayed on the display panel 100, a user can touch or blow the display panel 100 or illuminate the display panel 100 with infrared, and thus the controller 300 may perform a certain operation in response to the stimulus given after the UI information II is displayed. For example, the UI information II may include a message such as "Touch me," or may include information about operation to be performed by the controller 300, e.g., an operation such as "time display," "view close" or the like which follows the stimulus.

Figure 5:
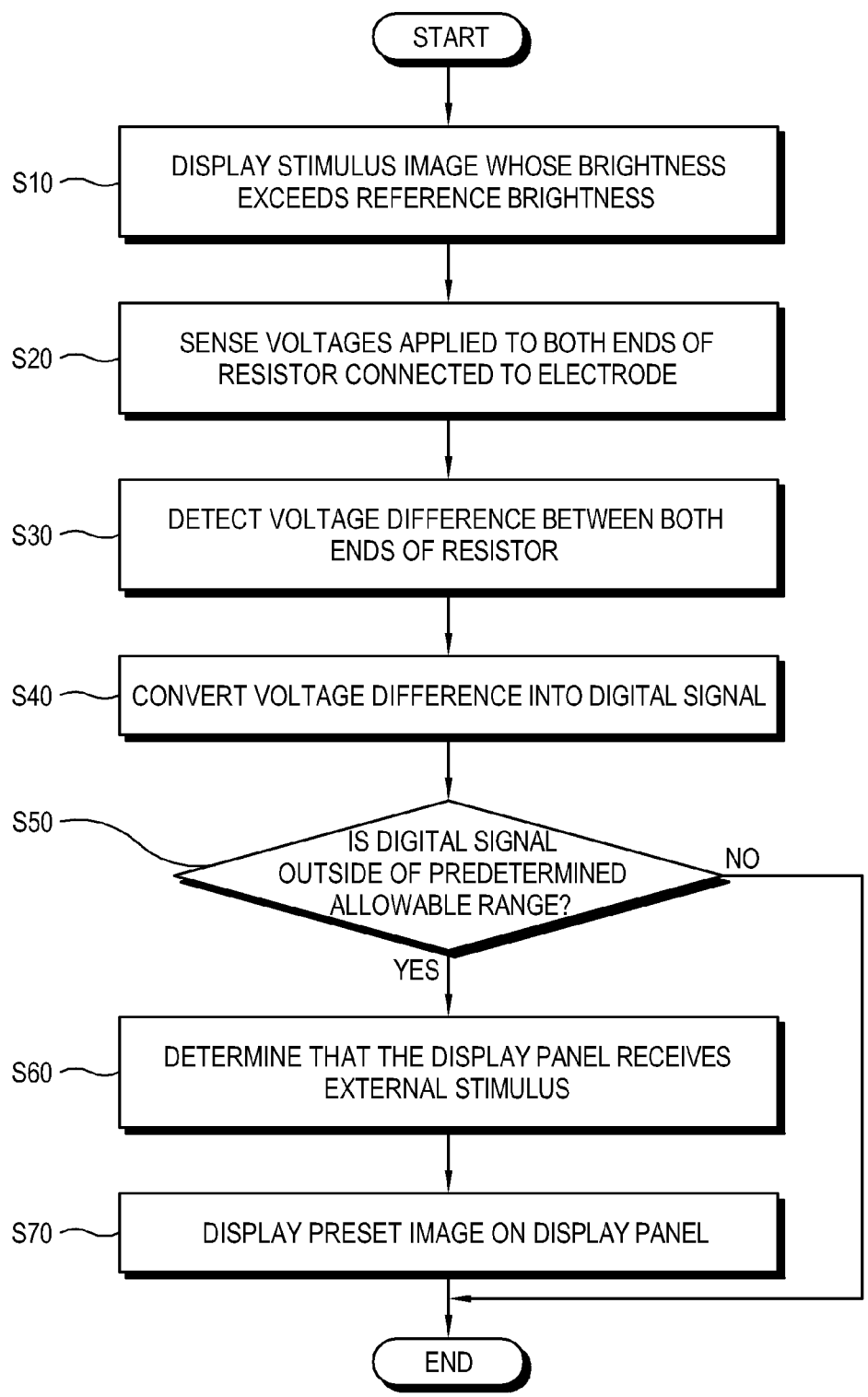
FIG. 5 is a control flowchart for explaining an exemplary embodiment of a control method in the display apparatus of FIG. 2.

FIG. 5 is a control flowchart for explaining a control method in the display apparatus of FIG. 2. Below, a control method of sensing the external stimulus and performing the operation in response to the external stimulus will be described with reference to FIG. 5. First, to induce a user to give the stimulus, the stimulus image I of which brightness exceeds the reference brightness is displayed on at least one region of the display panel 100 (S10). Besides the stimulus image I, the display panel 100 may display the UI information II as shown in FIG. 4.

Then, voltages applied to both ends of the resistor 210 are detected to sense the electric current flowing in the OLED (S20), and the difference between the voltages applied to both ends of the resistor 210 is determined (S30).

The controller 300 controls the ADC 310 to convert the voltage difference into a digital signal (S40), and determines whether the digital signal exceeds a predetermined allowable range to thereby compare the sensed electric current with respect to the preset current change rate (S50).

As a result, if the digital signal is outside of the allowable range, the controller 300 determines that the external stimulus is given (S60) and controls the display panel 100 to display a preset image (S70).

On the other hand, if the digital signal is within the allowable range, the controller 300 determines that there is no external stimulus and does not perform any operation.

Figure 6A:
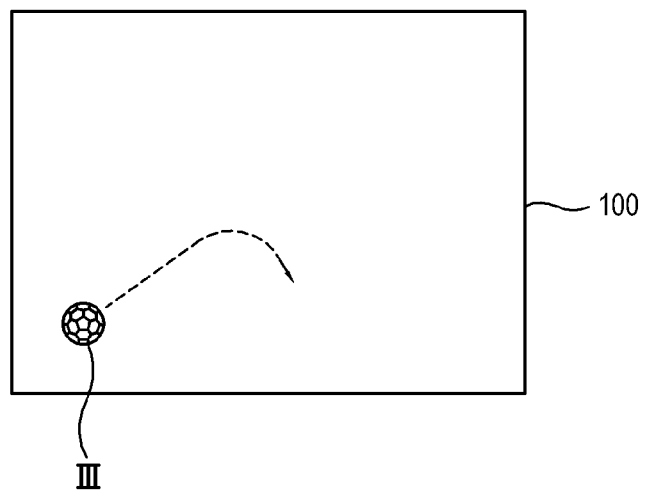
FIGS. 6A and 6B are images on a display panel for explaining another exemplary embodiment of a control method in the display apparatus of FIG. 2.
Figure 6B:
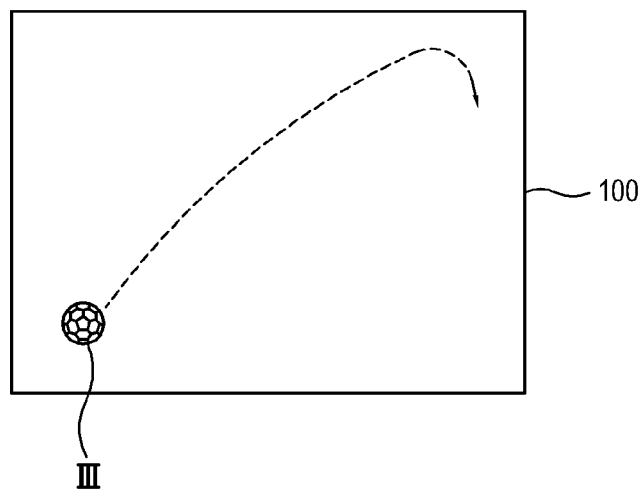

FIGS. 6A and 6B are images on a display panel for explaining another control method in the display apparatus of FIG. 2. The controller 300 determines the amplitude of the stimulus on the basis of the change rate of the sensed current, and displays an image varied depending on the amplitude of the external stimulus. As shown in FIGS. 6A and 6B, a soccer ball III corresponding to the stimulus image is displayed in a left lower part of the display panel 100. If a user gives the stimulus to the soccer ball III, the controller 300 determines that the stimulus occurs and performs a subsequent operation. In an exemplary embodiment, an image that the soccer ball III flies is displayed. At this time, the controller 300 determines the amplitude of the stimulus by detecting the change rate of the current with respect to a predetermined time, and adjusts a flying degree of the soccer ball, i.e., a moving degree of an image according to the determined amplitude of the stimulus. The controller 300 determines that more pressure is applied to the stimulus image as the change rate of the current increases with respect to a predetermined time, and controls the soccer ball III to fly farther. The soccer ball III of FIG. 6B flies farther than that of FIG. 6A, because the external stimulus applied to the display panel 100 of FIG. 6B is stronger than that of FIG. 6A. As described above, such an exemplary embodiment may be applied to a display apparatus where a game requiring a simple action is performed. Further, a plurality of operations may be performed according to the amplitudes of the stimulus applied to one stimulus image.

According to another exemplary embodiment of the present invention, the display panel 100 may display various stimulus images in sequence for periods of time, thereby sensing the stimulus of a user. For example, a first stimulus image of outputting a first control signal and a second stimulus image of outputting a second control signal are each repetitively displayed for several seconds in sequence, thereby allowing a user to select one of the two stimulus images. At this time, one stimulus image may be displayed during the minimum time when a user recognizes the image and gives the stimulus to the image, e.g., for 15 seconds. The controller 300 performs an operation corresponding to the first control signal if receiving a user's stimulus while displaying the first stimulus image, and an operation corresponding to the second control signal if receiving a user's stimulus while displaying the second stimulus image.

Figure 7A:
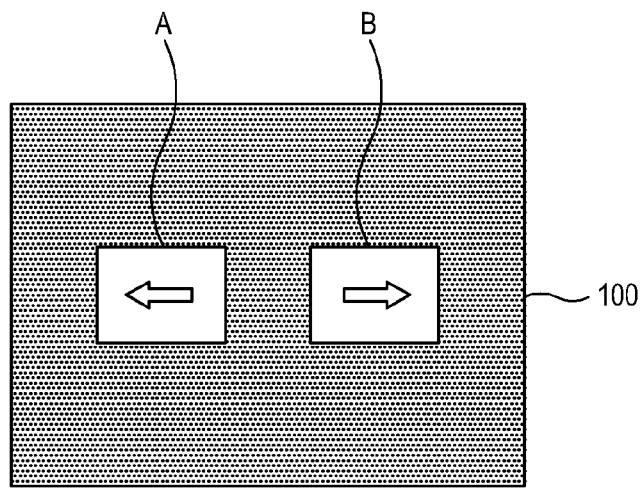
FIGS. 7A, 7B and 7C are stimulus images for explaining a control method in a display apparatus according to a third exemplary embodiment of the present invention.
Figure 7B:
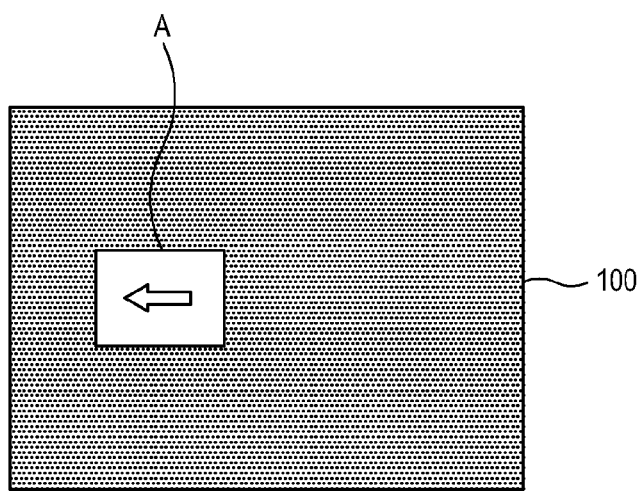
Figure 7C:
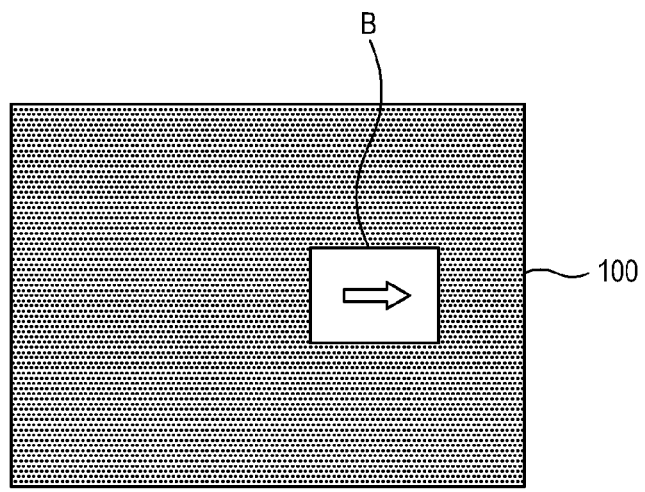

FIGS. 7A, 7B and 7C are stimulus images for explaining a control method in a display apparatus according to a third exemplary embodiment of the present invention. FIG. 7A illustrates a left arrow A and a right arrow B which can be recognized by a user. However, left and right arrows are displayed as shown in FIGS. 7B and 7C, respectively. The controller 300 repetitively displays a plurality of stimulus images (left arrow A and right arrow B) in sequence. For example, if the display panel 100 has a display frequency of 60 Hz, i.e., if 60 frames are displayed per second, the controller 300 displays the left arrow A in odd frames and the right arrow B in even frames. Although different images are displayed, a user cannot recognize alternation of the different images since the frames are very quickly generated. Accordingly, a user recognizes as if a still image is displayed such as shown in FIG. 7A. A user can give the stimulus to a desired arrow, and the controller 300 can determine which one of the stimulus images (i.e., the left and right arrows) receives the external stimulus on the basis of a point of time when the stimulus is given. For example, if the stimulus is given at a point of time when the odd frames are displayed, it is determined that the stimulus is given to the left arrow A and an operation corresponding to the left arrow A is performed. On the other hand, if the stimulus is given at a point of time when the even frames are displayed, it is determined that the stimulus is given to the right arrow B and an operation corresponding to the right arrow B is performed.

Since the other regions except the left arrow A do not emit light while the left arrow A is displayed, the controller 300 cannot receive the stimulus even though the external stimulus is given to the other regions. Accordingly, even if a user gives the stimulus to a region corresponding to the right arrow B while the left arrow A is displayed, the operation corresponding to the right arrow B is not implemented.

In brief, the display apparatus according to an exemplary embodiment displays different images repetitively with a time difference therebetween and determines which region receives the stimulus on the basis of information about the time when the stimulus occurs. Accordingly, it is possible to determine which position receives the stimulus, without additional elements, and an operation corresponding to the determined region can be implemented.

Figure 8:
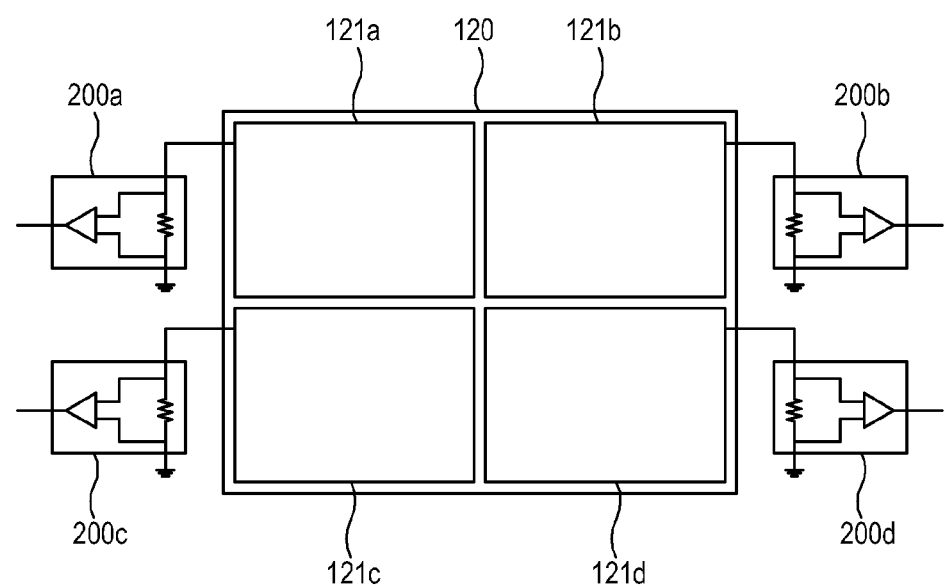
FIG. 8 is a schematic view of a display apparatus according to a fourth exemplary embodiment of the present invention.

FIG. 8 is a schematic view of a display apparatus according to a fourth exemplary embodiment of the present invention. FIG. 8 illustrates second electrodes 121a, 121b, 121c and 121d formed on the second substrate 120 of FIG. 2. In FIG. 2, the second electrode 121 is formed as a single body on the organic light emitting material 130 throughout the second substrate 120. However, in an exemplary embodiment, the second electrode is divided into four parts 121a, 121b, 121c and 121d as shown in FIG. 8, and a common voltage is individually applied to the divided second electrodes 121a, 121b, 121c and 121d. That is, the display panel 200 includes a plurality of light emitting regions corresponding to the plurality of second electrodes 121a, 121b, 121c and 121d.

Further, the display apparatus includes sensors 200a, 200b, 200c and 200d corresponding to the second electrodes 121a, 121b, 121c and 121d, respectively. Also, the display apparatus includes a controller (not shown) to receive output signals from the respective sensors 200a, 200b, 200c and 200d and determine whether there is an external stimulus. In an exemplary embodiment, the plurality of sensors 200a, 200b, 200c and 200d are connected to the plurality of light emitting regions, so that it is possible to determine which one of the light emitting regions receives the stimulus when a user gives the stimulus. Besides a simple control so that the controller becomes active or inactive according to existence of a stimulus, the controller may perform operations differing according to which light emitting region receives the stimulus. For example, if the display apparatus is capable of reproducing an image, the controller may perform various operations such as "play," "stop," "backward" and "forward." Further, if such a sensing region is divided into more parts, Arabic numerals (e.g., 110) and fundamental operators (+, −, / and *) may be displayed and calculation may be performed like that of a simple calculator. The controller individually determines information corresponding to the region that receives the external stimulus, and performs the rules of arithmetic.

The display apparatus according to an exemplary embodiment displays a plurality of stimulus images on different regions of the display panel 100 and determines a position of the stimulus image that receives the external stimulus similar to that of the third exemplary embodiment. To this end, the third exemplary embodiment displays the stimulus images for inducing the stimulus in sequence, and an exemplary embodiment may include a plurality of sensors 200.

Figure 9:
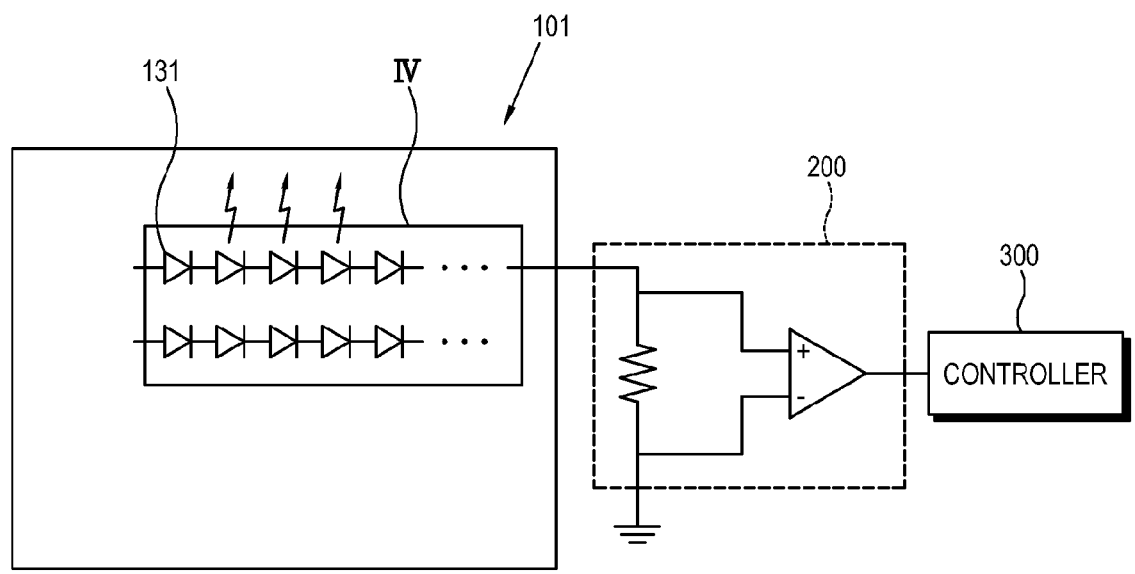
FIG. 9 is a schematic view of a display apparatus according to a fifth exemplary embodiment of the present invention.

FIG. 9 is a schematic view of a display apparatus according to a fifth exemplary embodiment of the present invention.

A display panel 101 is an LED panel formed with an LED 131 as a light emitting device to form an image. The LED panel is used to represent a simpler image and fewer colors than those represented by the organic light emitting display panel. The LED 131 emits light with different colors such as red, green and blue, and three or four LEDs different in color of emitted light constitute a light emitting unit. The light emitting unit may be employed as a unit pixel for displaying an image. Alternatively, the LED 131 used as the light emitting device may emit not red, green and blue light but white light. In this case, a color filter may be used for displaying an image. Further, only the LED for two colors may be used instead of the LED for the three primary colors, i.e., red, green and blue.

As shown in FIG. 9, only the LED 131 corresponding to a stimulus image IV for inducing a stimulus is turned on and emits light, but the LEDs corresponding to regions excluding the stimulus image IV are turned off and do not emit any light. In an exemplary embodiment, the stimulus image IV is shaped like a rectangular box and occupies a part of the display panel 101. Alternatively, the stimulus image IV may have various shapes. If an external stimulus is given to the stimulus image IV through which an electric current flows, the LED 131 is changed in temperature. The temperature change causes a threshold voltage of the LED 131 to change, and the change of the threshold voltage causes the electric current flowing in the LED 131. It is preferable but not indispensable that the electric current flowing in the LED 131 ranges from several μA, to several hundreds of μA enough to sense the change due to the external stimulus.

In general, at least one of the LED 131 is connected in series to be driven, and a cathode of the last LED 131 in the series is connected to a ground. The sensor 200 is connected between the cathode and the ground of the LED 131 to thereby sense the electric current flowing in the LED 131. A resistor and an amplifier included in the sensor 200 are similar to or substantially the same as those of the second exemplary embodiment.

The controller 300 determines the change of the electric current flowing in the LED 131 on the basis of an output signal from the sensor 200, and determines whether or not the external stimulus is given. In an exemplary embodiment, the stimulus image IV may be used for controlling a simple operation such as displaying a screen saver or switching between a power saving mode and a normal mode.

Meanwhile, a passivation film or a substrate may be formed on the LED 131 to thereby protect the LED 131. In this case, a user may give the stimulus to the LED 131 through the protection film or the substrate.

As described above, the present invention provides a display apparatus having a simple configuration to sense an external stimulus, and a control method thereof.

Further, the present invention provides a display apparatus reduced in cost and capable of sensing an external stimulus, and a control method thereof.

Also, the present invention provides a display apparatus capable of displaying an interesting image in response to a simple stimulus of a user, and a control method thereof.

Further, the present invention provides a display apparatus capable of sensing an external stimulus on the basis of a time lag between displayed images.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. A display apparatus comprising:
a display panel which comprises a light emitting device;
a sensor which senses an electric current flowing in the light emitting device; and
a controller which controls the display panel to display user interface (UI) information on a predetermined region of the display panel to induce and receive an external stimulus at the predetermined region of the display panel according to the displayed UI information, determines that the external stimulus occurs to the display panel if a change of the sensed electric current flowing in the light emitting device exceeds a preset current change rate, and performs an operation based on a determination result,
wherein the light emitting device comprises an organic light emitting material,
wherein while the UI information is displayed, the controller prevents supplying electric current flows to the light emitting device of another region of the display panel where the UI information is not displayed so that the controller does not determine the external stimulus on the another region.

2. The display apparatus according to claim 1, wherein the sensor comprises:
a resistor which is connected between either of a first electrode or a second electrode and a ground; and
an amplifier to which voltages applied to both ends of the resistor are input and which amplifies a difference between the input voltages,
wherein the controller determines that the external stimulus occurs to the display panel if an output signal from the amplifier is outside of an allowable range.

3. The display apparatus according to claim 1, wherein the UI information comprises a stimulus image, of which brightness exceeds a reference brightness.

4. The display apparatus according to claim 3, wherein the UI information comprises a plurality of stimulus images displayed on different predetermined regions, and the controller determines which one of the plurality of stimulus images receives the external stimulus.

5. The display apparatus according to claim 4, wherein the UI information comprises a plurality of stimulus images displayed in sequence, and the controller determines which one of the plurality of stimulus images receives the external stimulus on the basis of a point of time when the external stimulus is given.

6. The display apparatus according to claim 3, wherein the sensor is individually provided corresponding to the stimulus image.

7. The display apparatus according to claim 1, wherein the controller determines an amplitude of the external stimulus based on a change rate of the sensed electric current, and displays different images depending on the amplitude of the external stimulus.

8. The display apparatus according to claim 1, wherein the controller controls the display panel to display a preset image if the external stimulus is determined to occur to the display panel.

9. The display apparatus according to claim 1, wherein the light emitting device comprises a light emitting diode.

10. A display apparatus comprising:
a display panel which comprises an organic light emitting diode; and a controller which controls the display panel to display user interface (UI) information on a predetermined region of the display panel to induce and receive an external stimulus at the predetermined region of the display panel according to the displayed UI information and determines that the external stimulus occurs to the display panel if a threshold voltage of the organic light emitting diode is changed in response to a change in temperature of the display panel, wherein the organic light emitting diode comprises an organic light emitting material, and wherein while the UI information is displayed, the controller prevents supplying electric current flows to the light emitting device of another region of the display panel where the UI information is not displayed so that the controller does not determine the external stimulus on the another region.

11. A display apparatus comprising:

a display panel which comprises a light emitting device;

a sensor which senses an electric current flowing in the light emitting device at a predetermined region of the display panel; and a controller which controls the display panel to display user interface (UI) information on the predetermined region of the display panel to induce and receive an external stimulus at the predetermined region of the display panel according to the displayed UI information and performs an operation if a change of the sensed electric current at the predetermined region exceeds a preset current change rate, wherein the light emitting device comprises an organic light emitting material, and wherein while the UI information is displayed, the controller prevents supplying electric current flows to the light emitting device of another region of the display panel where the UI information is not displayed so that the controller does not determine the external stimulus on the another region.

12. A display apparatus comprising:

a display panel which comprises a light emitting device and a light emitting region divided into a plurality of sub-regions;

a plurality of sensors which sense an electric current flowing in each of the plurality of sub-regions; and a controller which determines that an external stimulus occurs to at least one of the plurality of sub-regions if a change of the sensed electric current in the at least one of the plurality of sub-regions exceeds a preset current change rate and performs an operation, and the controller further controls the display panel to display user interface (UI) information on at least one predetermined sub-region of the plurality of sub-regions of the display panel to induce and receive a user stimulus at the at least one predetermined sub-region according to the displayed UI information, wherein the light emitting device comprises an organic light emitting material, and wherein while the UI information is displayed, the controller prevents supplying electric current flows to the light emitting device of another region of the display panel where the UI information is not displayed so that the controller does not determine the external stimulus on the another region.

13. A method of controlling a display apparatus with a display panel comprising a light emitting device, the method comprising:

displaying user interface (UI) information on a predetermined region of the display panel to induce and receive an external stimulus at the predetermined region of the display panel according to the displayed UI information;

sensing an electric current flowing in the light emitting device;

determining that the display panel receives the external stimulus at the predetermined region of the display panel if a change of the sensed electric current exceeds a preset current change rate; and performing an operation based on a determination result, wherein the light emitting device comprises an organic light emitting material, and wherein while the UI information is displayed, the supply of electric current flows to the light emitting device of another region of the display panel where the UI information is not displayed is prevented, so that the external stimulus on the another region is not determined.

14. The method according to claim 13, wherein the display panel further comprises: a first electrode, a second electrode, the organic light emitting material is provided between the first electrode and the second electrode, and a resistor connected between either of the first electrode or the second electrode and a ground, and the sensing of the electric current comprises:

sensing voltages applied to both ends of the resistor;

determining a difference between the sensed voltages applied to both ends of the resistor; and converting the determined voltage difference into a digital signal.

15. The method according to claim 14, wherein the determining that the display panel receives the stimulus comprises determining that the display panel receives the external stimulus if the digital signal is outside of a predetermined allowable range.

16. The method according to claim 13, wherein the displaying of the UI information at the predetermined region comprises displaying a stimulus image, of which brightness exceeds a reference brightness.

17. The method according to claim 16, wherein the displaying of the stimulus image comprises displaying a plurality of stimulus images on different regions of the display panel individually, repetitively and sequentially, and the determining that the display panel receives the external stimulus comprises determining which one of the plurality of stimulus images receives the external stimulus based on a point of time when the external stimulus is given.

18. The method according to claim 13, wherein the determining that the display panel receives the external stimulus comprises determining an amplitude of the external stimulus based on a change rate of the sensed electric current, and the performing of the operation comprises displaying different images depending on the amplitude of the external stimulus.

19. The method according to claim 13, wherein the performing of the operation comprises outputting the determination result.

20. The method according to claim 13, wherein the performing of the operation comprises displaying a preset image on the display panel if the external stimulus is determined to occur to the display panel.

* * * * *